G. W. GARMAN.
SELF ALINING BEARING.
APPLICATION FILED APR. 5, 1919.
1,323,626.
Patented Dec. 2, 1919.
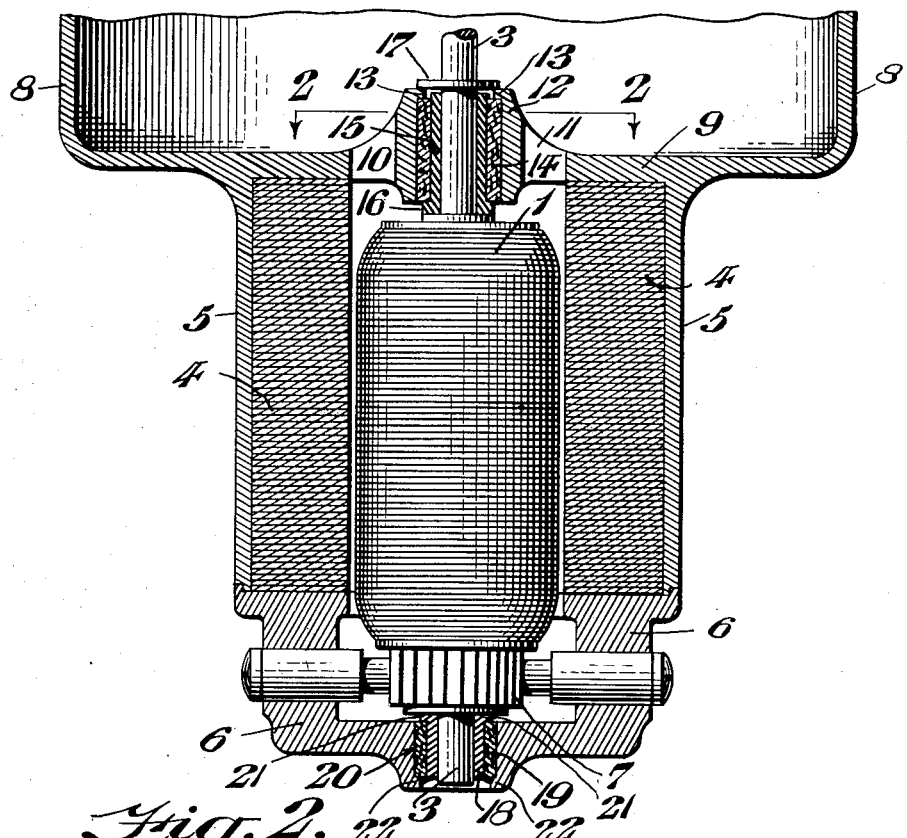
Fig. 1.
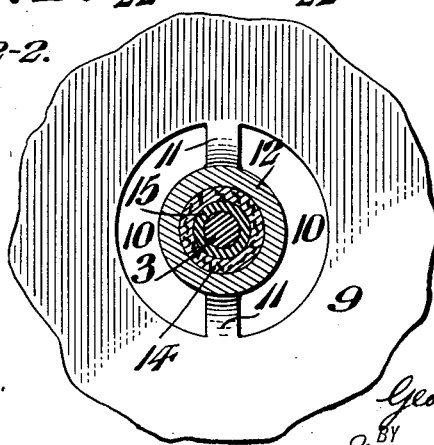
Fig. 2.
ON LINE 2-2.
FIG. 1.
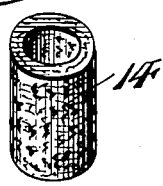
Fig. 3.
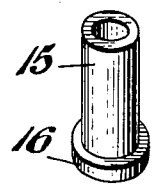
Fig. 4.
INVENTOR
George W. Garman.
BY
Niedersheim & Fairbanks
ATTORNEYS.

UNITED STATES PATENT OFFICE.

GEORGE W. GARMAN, OF PHILADELPHIA, PENNSYLVANIA, ASSIGNOR, BY MESNE ASSIGNMENTS, OF ONE-HALF TO ELECTORA MANUFACTURING COMPANY, A CORPORATION OF DELAWARE.

SELF-ALINING BEARING.

1,323,626.  Specification of Letters Patent.  Patented Dec. 2, 1919.

Application filed April 5, 1919. Serial No. 287,776.

*To all whom it may concern:*

Be it known that I, GEORGE W. GARMAN, a citizen of the United States, residing in the city and county of Philadelphia, State of Pennsylvania, have invented a new and useful Self-Alining Bearing, of which the following is a specification.

My invention relates to bearings for shafts in general, and more particularly to bearings which are employed for the support of vertically-disposed shafts in which it is of importance that there should be true vertical alinement.

While applicable, as stated, to shafts of different types and uses, my invention is of peculiar applicability to and intended for use with armature shafts of high speed motors.

In high-speed electrical motors, especially small ones with shafts ranging from $\frac{3}{16}''$ to $\frac{1}{2}''$ diameters, in the use of which variations of a few thousandths of an inch in the diameters of the shafts, the bearings or the bearing alinement, is not unusual, and where, moreover, the bearings are set in metal brackets or rigid holders which occasion rapid wearing-out and, in some instances, excessive chattering and humming noises which are disadvantageous in some of the uses to which these motors are put, as, for instance, in suction producing apparatus for use in connection with player pianos,— it is of great importance to secure such accurate alinement as will overcome these objections.

Further disadvantages incident to the operations of the armature shaft of electric bearings are, as is well known, the fact that the metallic atoms resulting from the use of the bearings commingle with the lubricant and of course increase the wear.

Various endeavors to secure and retain accurate alinement, have been made, and compensating springs, roller bearings and similar contrivances, have been tried without success.

It is the object of my invention to overcome the objections existing against inaccurate alinement and effectually to secure accurate alinement.

With this object in view my invention comprehends a bearing of the general character typically illustrated in the accompanying drawing and hereinafter described and claimed, and although this bearing is at present preferred by me, it is to be understood that various changes in the form, proportions, sizes and minor details of the bearing as an entirety, may be made without departing from the spirit or sacrificing any of the advantages of my invention.

Referring to the accompanying drawings, Figure 1 represents in central, vertical, sectional elevation a self-alining bearing embodying my invention, to which is shown applied the shaft of a vertically-disposed armature of a typical electric motor.

Fig. 2 represents a fragmentary plan view, sectional on the line 2—2 of Fig. 1.

Fig. 3 represents, in perspective, my cork bushing, or interlining, which is shown as removed from the device as illustrated in assembled relationship in Fig. 1.

Fig. 4 represents, in perspective and similarly removed from the assembled device, the internal metal bearing upon which the cork bushing is mounted.

Similar numerals of reference indicate corresponding parts.

In the drawings, 1 designates the armature of a typical electric motor, 3—3 the armature shaft, 4 the fields of the motor, and 5 the cylindriform body of a motor casing embracing and sustaining the fields.

To the lower open end of this casing a bracket 6 which supports the commutator 7 is removably attached.

In the illustration the upper end of the body or casing is shown as integral with or otherwise connected to and supporting a chambered vessel or container 8, the base plate 9 of which extends over the upper ends of the fields, is centrally circular and formed with segmental openings 10, bridging which and springing from the base plate are brackets 11 which support an external tubular boxing 12 formed with inturned overhanging flanges 13, which in the assemblage of the parts retain against endwise movement in an upward direction a cylindric cork bushing 14 which surrounds and fits snugly upon what I call an internal metal bearing or sleeve 15.

This bearing 15 is a hollow cylinder throughout, and at its base is formed with a radial outwardly-extending supporting flange 16 upon which the cork bushing 14 rests so as to be held in place between the flange 13 of the boxing 12 and the last named flange 16 of the bearing 15.

An upper collar 17 upon the upper end of the shaft 3 incloses the top of the bearing as an entirety.

The lower portion of the shaft 3 is similarly mounted in a bearing composed of an internal metal sleeve or bearing 18, surrounding which is a lower cork bushing 19 confined within a tubular boxing 20 formed in the commutator bracket 6.

The lower bearing sleeve 18 has a flange radially and outwardly extending from its top, and the tubular boxing 20 has a flange 22 radially and internally extending from its bottom.

In the manufacture of my bearing, the cork bushings are in external diameter cut slightly larger than the boxings into which they are forced, and their bores are slightly smaller diametrically than the external diameter of the metal bearings which are forced through them.

The bearings which are forced into the cork may be of the usual bronze or of a composition white metal, and of course the carrying boxings may be made of any desired metal.

I do not confine myself to any special dimensions for my cork bushings, as in their application to the bearings of high speed motors they may be made of different dimensions. I have found, however, that for a one-quarter inch shaft, one-eighth H. P.,—10,000 to 12,000 R. P. M.—⅛″ wall thickness is excellent.

While I prefer cork as the best material within my knowledge for the purpose intended, because it is not affected by dampness, oil or grease, is resilient to the vibration of the shaft, reduces some fifty per cent. the humming noise common to motor bearings, is low in cost and more durable than any material of which I have present knowledge,—I do not, of course, limit myself absolutely to cork technically as such but contemplate the use of any such equivalent elastic and compressible material as may possess the same advantages and be applicable to the same purposes.

In an application for patent for an improvement in suction producing apparatus executed and filed by me contemporaneously with this application, I have illustrated the use of the self-alining bearing which forms the subject-matter of this application;—and in connection with the apparatus referred to, I have found that its use makes it possible to operate the motor at a speed of 12,000 R. P. M. with the result that the apparatus itself by giving the necessary air displacement and vacuum through the suction fan is of enormous value in properly playing all kinds of music rolls including test rolls, and all kinds and makes of both foot treadle and reproducing action player pianos.

It will now be apparent that I have devised a novel and useful construction of a self-alining bearing which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, the combination of a rotary shaft, a boxing for said shaft having an inturned overhanging flange 13, a metal sleeve 15 engaging said shaft and provided with the terminal flange 16, and a cork bushing interposed between said boxing and said metal sleeve and retained between said flanges 13 and 16.

2. In a device of the character stated, a vertical shaft 3 having an upper collar 17 thereon, a boxing for said shaft having an upper inturned overhanging flange 13, located below said collar, a metallic sleeve 15 provided with a bottom terminal flange 16 and a cylindric cork bushing 14 interposed between said flanges 13 and 16 and fitting said metallic sleeve, said cork bushing being retained between said flanges 13 and 16 and said collar 17, being located above said flange 13.

3. In a device of the character stated, a rotary member having shafts projecting from the ends thereof, metallic sleeves contiguous to each of said shafts and provided with inner terminal flanges, a boxing surrounding each of said shafts and having outer inwardly projecting overhanging flanges, and a cork bushing surrounding each of said sleeves and interposed between the terminal flanges of each of said sleeves and the outer overhanging inturned flanges of said boxing.

4. In a device of the character stated, a rotatable member having shafts projecting upwardly and downwardly from the ends thereof, a motor casing having upper brackets carrying the boxing 12, said upper shaft projecting through said boxing, the latter having the inturned upper flange 13, a collar 17 on said upwardly projecting shaft located above said flange 13, a hollow metallic bearing engaging said shaft and provided with a bottom terminal flange, a cork bushing surrounding and fitting snugly upon said metal bearing, said cork bushing being confined between the terminal flange of said metal sleeve and the inturned overhanging flange of said boxing, a metal sleeve for said downwardly projecting shaft and a cork bushing surrounding said metal sleeve and contained within the lower brackets of said casing.

In testimony whereof I have hereunto signed my name this 29th day of March, 1919.

GEORGE W. GARMAN.

In the presence of—
J. BONSALL TAYLOR,
CHAS. W. YOUNG.